Oct. 1, 1968   R. M. RUSSELL   3,403,929
COUPLING MEANS FOR CORRUGATED TUBING
Filed July 28, 1967

ROBERT M. RUSSELL
INVENTOR.

BY Edward L Bell

ATTORNEY

United States Patent Office 3,403,929
Patented Oct. 1, 1968

3,403,929
COUPLING MEANS FOR CORRUGATED TUBING
Robert M. Russell, Newark, Del., assignor, by mesne assignments, to Hercules Incorporated, New Castle, Del., a corporation of Delaware
Filed July 28, 1967, Ser. No. 656,855
10 Claims. (Cl. 285—177)

ABSTRACT OF THE DISCLOSURE

This invention relates to coupling means for the end of a thermoplastic tubing and particularly tubing of a material such as polyethylene that resists adhesion, which coupling means comprises an adapter that telescopically receives the end of the tubing and is itself telescopically reecived with a conventional fitting, the adapter and fitting being of a material that can be readily connected adhesively. The tubing is mechanically secured to the adaptor by a key in a slot in the adaptor and extending into a valley of the tubing with an end section of the tubing compressed between the key and a flange at the end of the adaptor.

---

The present invention relates to coupling means for joining or connecting the end of corrugated tubing to a fitting such as an angle, joint or connector.

The objects of this invention are to provide a coupling means for corrugated tubing which is simple and inexpensive, easy to operate, and which will provide a secure and effective coupling. A further object of this invention is to provide a coupling means particularly adapted for use with corrugated tubing of thermoplastic material such as polyethylene, which cannot be readily secured by known adhesives. Another object of this invention is to provide coupling means for corrugated tubing that does not reduce the effective internal diameter or cross section of the tubing.

The above objects have been achieved by providing an adaptor bushing that is mechanically secured to the end of the corrugated tubing and which is in turn formed of a material, for example, polyvinyl chloride, that can be readily secured adhesively to a conventional fitting for thermoplastic pipe. The mechanical connection between the tubing and the adaptor bushing is provided by a key inserted into a slot in the side wall of the bushing and extending into a corrugation of the tubing. The adaptor may also include an inwardly-directed flange at the end of the bushing against which the end of the tubing abuts and against which it is held under some compression by the key. Packing means may be inserted to form a seal between the periphery of the tubing and the bushing.

With the above and other objects in view, the present invention is hereinafter disclosed with reference to the accompanying drawings, in which.

Figure 1:
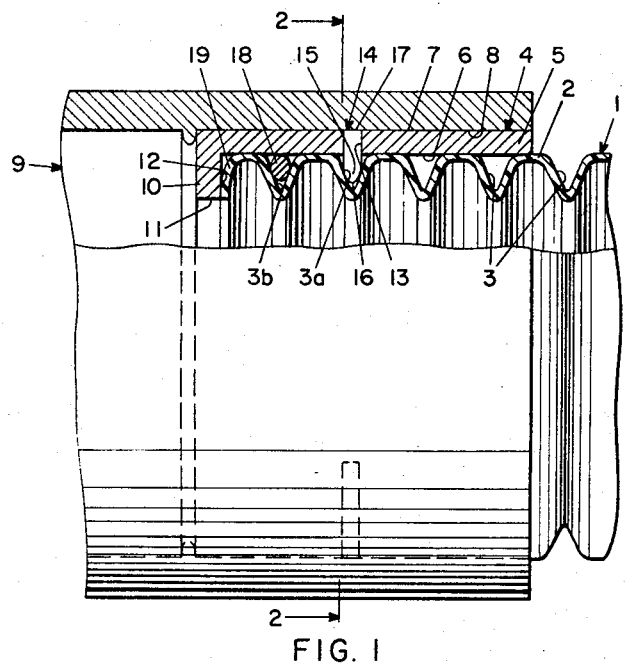
FIG. 1 is a fragmentary view partly in longitudinal section and partly in elevation of the end of a corrugated tubing together with an adaptor bushing in accordance with this invention and a coupling fitting.
Figure 2:
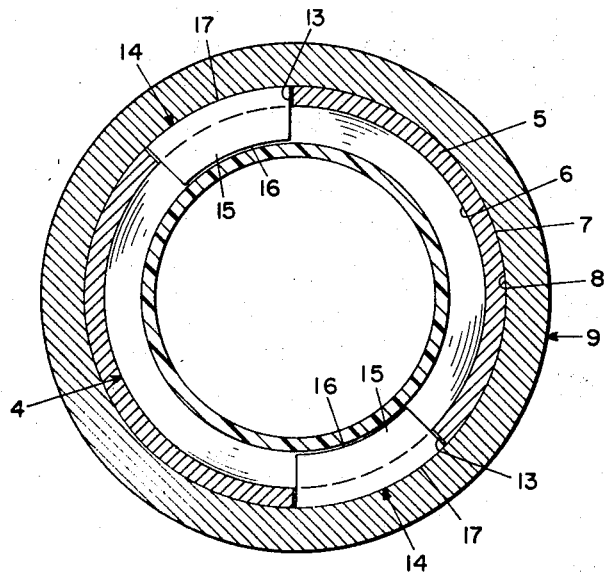
FIG. 2 is a fragmentary sectional view taken substantially on the line 2—2 of FIG. 1.

With reference to the drawings, there is illustrated the end of a corrugated tubing 1 that consists of an alternating series of ridges 2 and valleys 3 with the wall of the tubing undulating between its maximum peripheral diameter at the ridges 2 and its minimum peripheral diameter at the valleys 3. The tubing 1 is of conventional configuration and is adapted to be made by blow molding in a continuous operation from a thermoplastic material such as polyethylene. In accordance with the preferred arrangement, the ridges 2 and valleys 3 are formed so that each is continuous or, in other words, constitutes an individual continuous ring around the periphery of the tubing and is formed in a plane normal to the axis of the tubing.

The end of the tubing 1 is telescoped into an adaptor bushing 4 having a substantially cylindrical side wall 5 which has an inner surface 6 that is smooth and is dimensioned relative to the maximum diameter of the tubing 1 to receive the tubing 1 with a relative close fit or tolerance. The outer surface 7 of the bushing 4 is also smooth and is dimensioned relative to the bore 8 of a fitting 9 to be telescopically received therein with a relatively close tolerance.

The end of the adaptor bushing 4 adjacent to the end of the tubing 1 is provided with an inwardly extending flange 10 having a free edge 11 that defines an opening in the flange that is substantially as large as the minimum internal diameter of the tubing 1. The inner face 12 of the flange 10 constitutes a shoulder surface against which the end of the tubing 1 abuts.

In the side wall 5 of the adaptor bushing 4 there are provided slots 13 arranged with their centerlines adapted to overhang the base of a valley 3 in the tubing 1. Accordingly, with the ridges 2 and valleys 3 arranged in planes normal to the axis of the tubing 1, the centerlines of the slots 13 are also arranged in a plane normal to the axis of the bushing 4 whereby they will also be in a plane normal to the axis of the tubing when the bushing and tubing are assembled. Each of the slots 13 is adapted to receive a key 14 that is deep enough to extend through the slot 13 and into the adjacent valey 3 of the tubing 1, herein termed the key valley 3a.

The leading or inner end 15 of each of the keys is beveled to a blunt point conforming to the dimension of the valley 3a whereby the key will cam itself into the valley. The keys are each substantially arcuate lengthwise so that the inner edge 16 at the inner extremity of the end 15 conforms to the periphery of the tubing substantially at the base of the valley 3a and the outer edge 17 of the key conforms to the periphery of the outer surface 7 of the side wall 5 of the bushing 4 so that the key will be disposed entirely within the periphery of the busing when in the coupling position. In the assembled relation as illustrated in FIG. 1, the keys 14 are held in position by the fitting 9. While the side edges of the keys 14 as herein illustrated are radial relative to the center of the tubing 1, they could be parallel so that the inner edge 16 and the outer edge 17 of the keys would be equal in length.

The slots 13 as illustrated are spaced from the shoulder surface 12 an amount sufficient to position at least one complete valley 3, for exampe the valley 3b which is herein termed the packing valley, between the key 14 and surface 12. Packing means such as an O-ring 18 is located in the valley 3b and acts to form a seal between the inner surface 6 of the bushing and the periphery of the tubing 1.

In the assembled relation, the section of tubing from the end to the key valley 3a is slightly under compression so that not only is the bushing 4 secured relative to the tubing 1, but also, the valley 3b is somewhat collapsed and the packing means 18 is thus compressed to provide a tighter seal. To compress the tubing between the key 14 and the shoulder surface 12, the tubing is trimmed at a predetermined distance from the key valley 3a and the slots 13 are spaced from the shoulder surface 12 a distance slightly less than the length of the tubing from the key valley 3a to the end. Thus, with an excess length of tubing present, the end of the tubing must be forced into the bushing 4 against the shoulder surface 12 to align the key valley 3a with the slots 13, thus compressing the end of the tubing. With the tubing trimmed at the base of a valley 3 as shown, there is provided a free wall 19 for engaging the shoulder surface 12, which wall is relatively resilient.

The length of the slots 13 circumferentially of the bushing 4 is limited to provide sufficient area through which tension can be exerted between the keys 14 and the flange 10, which tension is the force maintaining the compression of the end section of the tubing 1. There is also preferably provided a plurality of slots 13 distributed uniformly or in a balanced manner about the periphery of the bushing so that the forces will be equally uniformly distributed. While there are two slots 13 in the illustrated embodiment of the invention, it will be apparent that a different number of uniformly spaced slots could be employed.

The adaptor bushing 4 and the fitting 9 may be formed for example by injection molding from a thermoplastic material such as polyvinyl chloride. The fitting 9 may comprise essentially a standard fitting commonly used with conventionally smooth-walled thermoplastic tubing, for example, angles, joints and connectors. One of the advantages of the present invention is that the bushing 4 constitutes means for conveniently adapting corrugated tubing for use with standard fittings by enlarging the periphery thereof to a standard size. A further advantage of the present invention is that the bushing 4 can be made of a material different from the material used for the tubing 1. Thus, the tubing 1 can be made of material such as polyethylene selected for characteristics advantageously in its intended use even though that material may be difficult or impossible to join adhesively to itself or to another material. In this manner, polyethylene tubing can be simply and inexpensively joined by an adaptor mechanically secured to the end of the tubing and which is formed of a material such as polyvinyl chloride that can be readily joined adhesively.

In the use of the adaptor bushing 4 of this invention, the end of the tubing 1 is trimmed at the base of one of the valleys 3, and is then coated with an adhesive and inserted into the bushing 4. The adhesive used is compatible with the bushing 4 and, though it will not afford sufficient adhesion to the tubing 1, it acts as a seal between the tubing 1 and the packing ring 18 on the one hand and the bushing 4 on the other hand. The end of the tubing 1 may then be trimmed again using the free edge 11 of the flange 10 as a guide. The bushing 4 is then coated with an adhesive and is inserted into the fitting 9. When the adhesive has set, the tubing 1 is securely fastened to the fitting 9 in a leak-proof manner. Alternatively, the bushing 4 and the fitting 9 may be provided with external and internal threads respectively whereby they can be secured by threaded engagement rather than adhesively.

While the ridges 2 and valleys 3 preferaby define continuous rings, it will be apparent that they could also be formed spirally of the tubing. With the ridges 2 and valleys 3 formed spirally of the tubing 1, the packing could be a length of packing material laid in the valley 3 rather than the ring 18. The slots 13 would then also be disposed on a line spirally of the tubing and conforming the configuration of the valleys 3 so that it would follow and overlie the valley 3. In this case, the end of the tubing 1 may be cut on a plane normal to its axis, in which case there would not be provided a continuous resilient wall 19 to abut the inner face 12 of the flange 10.

In some applications, such as in irrigation, a water-tight seal between the tubing 1 and the adaptor bushing 4 may not be necessary. In these instances, the packing ring 18 may be eliminated, and if a special adaptor bushing 4 were to be made for such an application, it could be made without the flange 10.

What I claim and desire to protect by Letters Patent is:

1. An adaptor bushing for corrugated plastic tubing comprising a cylindrical side wall with a substantially smooth inner surface for telescopically receiving an end of the tubing and having a close tolerance relative to the periphery of the tubing and with an outer surface adapted to be inserted into and peripherally secured in a fitting, said bushing having slot means in the side wall thereof, said slot means being arranged on a centerline in a plane generally transversely of the bushing and adapted to intersect the center of a valley in the tubing and being discontinuous circumferentially around said bushing, a removable key inserted into said slot means and extending into a valley in the tubing to couple said bushing to the tubing, said key having an outer surface disposed within the periphery of said bushing in the coupled position and retained in said slot by the fitting.

2. An adaptor bushing for corrugated plastic tubing in accordance with claim 1 having a flange at one end of said bushing extending inwardly to provide a shoulder surface internally of the bushing and an opening axially thereof defined by the inner edge of said flange, which opening is at least substantially as large as the minimum cross sectional area of the tubing.

3. An adaptor bushing for corrugated plastic tubing in accordance with claim 2 in which the opening defined by the inner edge of said flange is substantially equal to the minimum cross sectional area of the tubing.

4. An adaptor bushing for corrugated plastic tubing in accordance with claim 2 in which said slot means includes a plurality of slots distributed in a balanced manner about the circumference of the bushing.

5. An adaptor bushing for corrugated plastic tubing in accordance with claim 4 in which said slot means is disposed with the centerline thereof in a plane normal to the axis of the bushing for adapting the same for use with tubing having corrugations comprising an alternating series of ridges and valleys each of which is a continuous ring extending circumferentially about the tubing.

6. An adaptor bushing for corrugated plastic tubing in accordance with claim 5 in which said slot means is spaced from said shoulder a distance greater than the distance between one valley and the corresponding point of the adjacent valley of the tubing by an amount sufficient to provide one complete valley between said slot means and said shoulder when the tubing is inserted into the bushing against the shoulder and a valley is aligned with said slot means.

7. An adaptor bushing for corrugated plastic tubing in accordance with claim 6 and having packing adapted to be disposed internally of said bushing and to cooperate with the periphery of the tubing to provide a seal between the bushing and the tubing.

8. An adaptor bushing for corrugated plastic tubing in accordance with claim 7 in which said packing comprises a ring adapted to be seated in the valley of the tubing disposed between said slot means and said shoulder and to be compressed and thereby forced against the inner surface of the side wall of said bushing upon endwise compression of the tubing between the key and the shoulder.

9. An adaptor bushing for corrugated plastic tubing in accordance with claim 5 in which said bushing is adapted to receive under slight compression substantially two corrugations of the tubing between the key and the shoulder whereby, with said key seated in one valley, there is provided between said key and said shoulder one valley and the free wall of a further valley that is adapted to abut against said shoulder.

10. An adaptor bushing for corrugated plastic tubing in accordance with claim 1 in which said bushing has a substantially smooth outer surface that is adapted to be telescopically inserted into and to be adhesively secured within the bore of a fitting.

References Cited

UNITED STATES PATENTS

| | | | |
|---|---|---|---|
| 1,232,447 | 7/1917 | Horne | 285—420 |
| 2,216,468 | 10/1940 | Farrar | 285—226 |
| 2,550,099 | 4/1951 | Vance | 285—7 |
| 3,017,654 | 1/1962 | Allenby et al. | 285—7 |
| 3,212,795 | 10/1965 | Helm et al. | 285—7 |
| 3,236,543 | 2/1966 | Mueller | 285—174 |
| 3,348,862 | 10/1967 | Leopold et al. | 285—174 |

CARL W. TOMLIN, *Primary Examiner.*

W. L. SHEDD, *Assistant Examiner.*